Aug. 25, 1931.     D. C. GALL     1,820,219
OPTICAL PYROMETER
Filed June 23, 1928
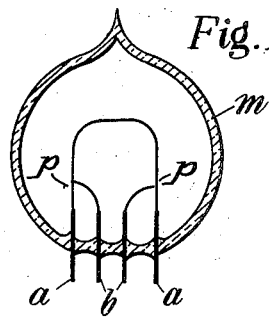
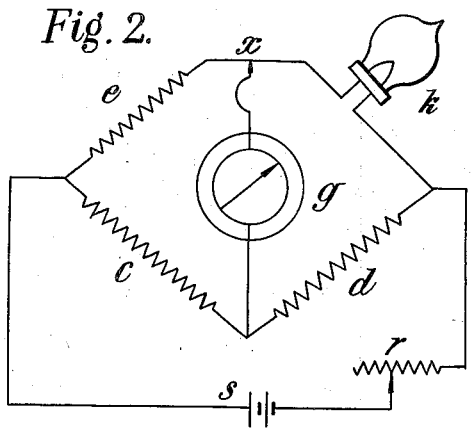
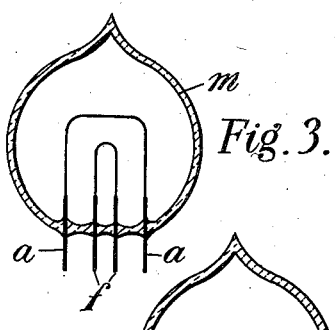
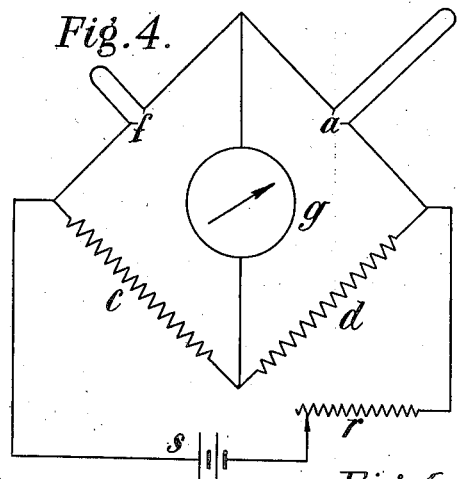
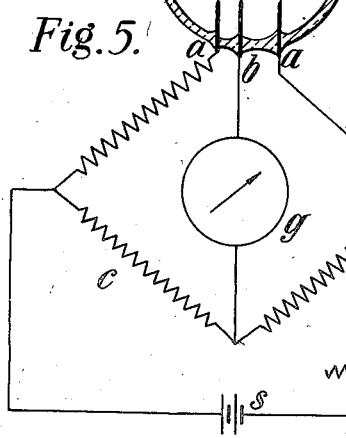
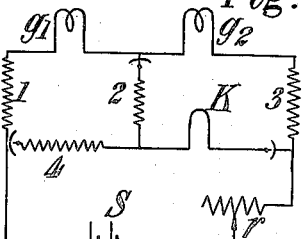
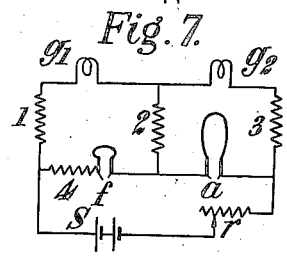
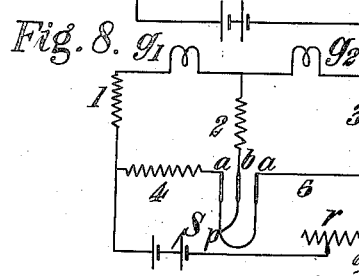
INVENTOR
Douglas Chief Gall
BY
P. Sokal
ATTORNEY Patented Aug. 25, 1931

1,820,219

UNITED STATES PATENT OFFICE

DOUGLAS CRISP GALL, OF SOUTH NORWOOD, ENGLAND

OPTICAL PYROMETER

Application filed June 23, 1928, Serial No. 287,683, and in Great Britain June 29, 1927.

My invention relates to optical pyrometers of the type in which the brightness of the object whose temperature is to be measured is matched against that of the central portion of the filament of an electric lamp, the brightness of which is adjustable by varying the current through it.

The brightness or temperature scale of the pyrometer can be defined, if desired, by reference to the current passing through the lamp filament, but for certain purposes, as is well known in the art, it is convenient to employ the total resistance of the lamp filament or a combination of the current and the total resistance as the variable for refining the temperature scale.

When the total resistance of the filament is so employed, either wholly or partially, certain errors are liable to arise, which it is the object of my invention to prevent.

In particular, when the temperature of the filament is altered widely, heat is conducted to or from the heavy current leads passing through the base of the lamp. Owing to the mass of these leads and of the materials of the lamp base with which they are in contact, a considerable time elapses before those portions of the filament nearest to the leads attain their equilibrium of temperature and hence of resistance. The readings given before the equilibrium is reached are thus subject to error.

Another source is that due to change in the temperature of the surroundings of the filament, such as the metal casing in which the pyrometer lamp is contained and which may become considerably heated on exposure in front of a furnace.

It is well known, from the laws governing the radiation of heat, that the temperature and resistance of an incandescent filament in a vacuum are not appreciably affected by such changes in the temperature of the surroundings as are likely to be encountered in practice. This applies to the central portion of the pyrometer filament but with the progressive fall in temperature which occurs in passing from the central portion to the ends of the filament, changes in the temperature of the surroundings produce an increasing effect on the temperature and resistance of the filament.

In my invention I arrange for the partial or complete elimination of these effects. For this purpose I provide inside the lamp a resistance of appropriate dimensions and disposition preferably arranged as a loop of wire. The resistance, and temperature coefficient of resistance, of this loop are such that they compensate for the leads and the portions of the filament connecting the leads with the central portion of the filament. In one arrangement of the compensating loop, I make a loop of wire of the same material and diameter as that forming the filament and place the loop inside the bulb of the lamp where it is subjected to the same heating or cooling conditions which apply to the filament itself. The loop is in this arrangement entirely separate from the filament and has therefore two separate leads in the base of the lamp by means of which it may be connected to the circuit in the required manner.

In another arrangement the loop is partly merged in the filament of the lamp so that it has only one separate lead in the base.

In a third construction two compensating loops are used but each compensating loop is partly merged in the filament so that only two additional leads are required.

Various embodiments of the invention will now be described with reference to the accompanying drawings in which:

Fig. 1 shows a lamp having two compensating loops each partly merged in the filament of the lamp and each having only one additional lead in the base of the lamp.

Fig. 2 shows a known Wheatstone bridge circuit arrangement with a lamp of known type.

Fig. 3 shows a lamp having an entirely separate compensating loop with two separate leads in the base.

Fig. 4 shows the preferred Wheatstone bridge arrangement and the position of the lamp filament and the compensating loop in contiguous arms of the bridge.

Fig. 5 shows a third construction of the lamp in which one compensating loop is used which is partly merged in the lamp filament and has therefore only one separate lead in the base and a circuit arrangement for using the lamp.

Fig. 6 shows a known circuit arrangement in which a differential galvanometer winding and a known lamp are used.

Fig. 7 shows the application of a lamp according to Fig. 3 to the circuit according to Fig. 6.

Fig. 8 shows the application of a lamp according to Fig. 5 to the circuit according to Fig. 6.

When the voltage drop on the lamp as given, by a voltmeter, is used for the purpose of the temperature scale, I arrange the lamp filament as shown in Fig. 1. Here $a$ and $a$ represent the usual leads for the current passing through $m$ the glass envelope of the lamp, but instead of attaching the voltmeter to $a$ and $a$ I attach it to the leads $b$, $b$ which are connected by very fine wires to the filament at points $p$, $p$. These latter points are so chosen that the resistance of the portion of the filament lying between them is not, as explained above, appreciably affected by changes in the temperature of the surroundings. For the same current, therefore, a constant voltage drop is always obtained between the points $p$, $p$. Moreover the errors which, as explained above, arise from the lag in the temperature of the base of the lamp and the heavy leading-in wires now become unimportant since with the arrangement shown in Fig. 1, the leading-in wires $b$, $b$ and the wires connecting $b$, $b$ to $p$, $p$ form part of the voltmeter circuit and normally account for only a small fraction of the total resistance of that circuit.

When the resistance only of the lamp is used as the characteristic for temperature measurement, the lamp is associated with some form of resistance measuring device, such for example, as the Wheatstone bridge shown in Fig. 2. Here K is the lamp $c$, $d$, $e$ and $x$ fixed resistances, $g$ a galvanometer connected to the resistance $x$ by a movable contact which can be moved along $x$ until the bridge is balanced and no current flows through the galvanometer. S is a battery and $r$ a rheostat, for supplying and regulating the current to the bridge and the lamp, and hence used for varying the temperature of the lamp filament.

When the bridge shown in Fig. 2 is used as above indicated, the resistance characteristic of the lamp is employed, for the purpose of the temperature scale.

If, however, the galvanometer contact with $x$ is fixed and the resistance of the arms of the bridge are such that for a certain current through the bridge it is balanced, while for an increased or decreased current the resistance of the lamp K changes relatively to that of the other arms of the bridge, which is thus thrown out of balance. Then the resulting current through the galvanometer $g$ can be used for the purpose of obtaining the temperature scale. The scale in this case would depend on a combination of the resistance and current characteristics of the lamp. In either of the above arrangements I compensate for the errors already described by means of a resistance of appropriate dimensions and disposition, which may be conveniently arranged as a loop of wire, as shown in Fig. 3. Here $a$, $a$ represent, as in Fig. 1, the thick current leads passing through the glass envelope of the lamp and, connected to the filament, and $f$, $f$ are similar leads connected to a loop of wire. The resistance, and temperature coefficient of resistance, of this loop are such that they compensate for the portions of the filament which are liable to be affected in resistance by changes in the temperature of the surroundings. The circuit arrangement for this purpose may conveniently be as shown in Fig. 4. As in Fig. 2 $c$ and $d$ are fixed resistances, or ratio arms, which may conveniently be made equal while the lamp filament with the current leads $a$, $a$ form, wholly or in part, another arm of the bridge and the compensating loop with the leads $f$, $f$ form, wholly or in part, the remaining arm of the bridge. It is obvious that, with the arrangement shown, the two sources of error to which attention has been drawn above, apply equally in contiguous arms of the bridge and hence compensate for each other.

In order to adjust the magnitude of the effect produced by the compensating loop, the loop may form the whole of the arm of the bridge, and may, if desired, be shunted by another loop of different material, or the loop may form part of the arm of the bridge, the remaining part being of different material, and of this composite arm of the bridge the whole or part may be shunted by another loop of material.

In another arrangement applicable to the type of circuit shown in Fig. 2, I make use of a lamp similar to that indicated in Fig. 1, but with one of the leads $b$, $b$ absent. A diagram showing a circuit arrangement suitable for this case is given in Fig. 5. In this arrangement $c$ and $d$ are ratio arms which would normally be equal in resistance. The lamp being connected to the bridge as shown, it will be noted that the two current leads $a$, $a$ are situated in different arms of the bridge and hence the errors due to temperature lag in these leads and the lamp base balance each other. Further, there are similar portions of filament $a$, $p$ in each arm, which will be affected equally by changes in the temperature of the surroundings, and hence compensate for each other. As in the case of the previous arrangement, the loop shown as $b$, $p$, $a$ in Fig. 5 may be shunted by a loop of different material or the whole of the arm of which $b$, $p$, $a$ forms a part may be so shunted.

In the case of Figs. 2, 4 and 5 the battery and galvanometer may be interchanged if desired.

Fig. 6 shows a known circuit arrangement for optical pyrometers in which a differential galvanometer winding and a known pyrometer lamp are used. In this figure 1 and 3 are resistances, K is the pyrometer lamp, $g_1$ and $g_2$ are the two coils of a differential galvanometer. These two coils are wound on the same bobbin and can rotate between the poles of the usual galvanometer magnet. The currents in $g_1$ and $g_2$ can be arranged to be in opposite directions, and then by adjusting the resistance 4 the galvanometer can be made to give no deflection for any desired temperature (or resistance) of the lamp (say 700° C.). 2 is another adjustable resistance, S is a source of current and $r$ is a rheostat. On increasing the current through the bridge, the resistance of the lamp is altered while 4 remains the same in resistance and hence a deflection is caused in the galvanometer owing to the different currents in the coils $g_1$ and $g_2$. This arrangement is subject to precisely the same errors as the previously described Wheatstone bridge arrangement, and these errors can be eliminated or reduced in precisely the same way by including a compensating resistance in the arm 4.

Fig. 7 shows the lamp according to Fig. 3 applied to the circuit of Fig. 6, the compensating resistance being indicated at $f$, $f$ and the lamp filament at $a$, $a$.

Fig. 8 shows the employment of the lamp of Fig. 5 to the circuit of Fig. 6. It will be seen that the main leads $a$, $a$ are connected to two arms 4 and 5 whereas the additional lead $b$ is connected to the resistance 2 and the point $p$ of the filament.

While I have described above certain examples of circuits to which my invention is applicable, it will be understood that there are many other arrangements of circuits to which it would also apply. The essential feature of my invention is that by means of a pyrometer lamp of one of the types described with compensating resistance inside the lamp bulb it is possible to insure that, in effect, only the central portion of the filament, which is immune from errors due to changes in temperature of the surroundings or lag effects in the base of the lamp or leading-in wires, is used for the purpose of obtaining the temperature scale.

I claim:

1. An optical pyrometer comprising in combination: a Wheatstone bridge, a galvanometer in said bridge, a lamp in one of the arms of the bridge, a compensating resistance loop inside said lamp arranged in a contiguous arm of the bridge, a source of current for supplying current to the bridge and to the lamp and means for regulating the current.

2. An optical pryometer comprising a Wheatstone bridge, a galvanometer in said bridge and fixedly connected to opposite points of the bridge, a pyrometer lamp in one of the arms of the bridge, a compensating resistance in said lamp arranged in a contiguous arm of the bridge, a source of current for supplying current to the bridge and the lamp, and means for regulating the current substantially as described.

3. In an optical pyrometer of the type in which the brightness of the object to be measured is matched against that of the central portion of the filament of an electric lamp, the brightness of which is adjustable by varying the current through it, the combination of: a variable source of electric current; a network of resistances connected at two points with the source of electric current; a galvanometer connected with the network of resistances to indicate any change in the resistance of any one branch of the network; a pyrometer lamp comprising a central filament portion, leads through the base and filament portions connecting the central portion to the leads, all arranged in one branch of the network; a compensating resistance contained within the lamp arranged in another branch of the network so chosen that an increase in resistance of this branch acts on the galvanometer in an opposite sense to an increase in resistance of the branch containing the filament, the said filament and compensating resistance being the only parts of the network, the resistances of which are substantially affected by changes of the electric current passing through them, substantially as described.

4. In an optical pyrometer of the type in which the brightness of the object to be measured is matched against that of the central portion of the filament of an electric lamp, the brightness of which is adjustable by varying the current through it, the combination of: a variable source of electric current; a network of resistances connected at two points with the source of electric current; a galvanometer connected with the network of resistances to indicate any change in the resitance of any one branch of the network; a pyrometer lamp containing a filament portion and a compensating resistance inside the lamp having a common lead connected to one end of each and having separate leads connected to the other two ends, the three leads passing out through the base of the lamp and being so connected to the network that the filament and compensating resistance are in contiguous branches of the network, the said filament and compensating resistance being the only parts of the network the resistances of which are substantially affected by changes of the electric current passing through them, substantially as described.

5. In an optical pyrometer of the type in which the brightness of the object to be measured is matched against that of the central portion of the filament of an electric lamp, the brightness of which is adjustable by varying the current through it, the combination of: an electric circuit having four arms, a bridge connecting two diagonal points of the circuit, a variable source of current connecting the two other diagonal points of the circuit, a pyrometer lamp in said circuit; means for altering the current passing through the lamp; a galvanometer in said circuit by the aid of which the temperature of said lamp is measured; said lamp comprising a central filament portion, leads through the base, filament portions connecting the central portion to the leads, all arranged in one arm of the circuit, and a compensating resistance inside the lamp arranged in a contiguous arm of the circuit, substantially as described.

Signed at London this 13th day of June, 1928.

DOUGLAS CRISP GALL.